United States Patent [19]
Greinke

[11] Patent Number: 6,149,972
[45] Date of Patent: Nov. 21, 2000

[54] EXPANDABLE GRAPHITE AND METHOD

[75] Inventor: Ronald Alfred Greinke, Medina, Ohio

[73] Assignee: UCAR Graph-Tech. Inc., Nashville, Tenn.

[21] Appl. No.: 09/015,590

[22] Filed: Jan. 29, 1998

[51] Int. Cl.⁷ .............................. B05D 7/00; B05D 3/04; B05D 5/00

[52] U.S. Cl. ..................... 427/220; 427/212; 427/215; 427/333; 427/301; 427/399

[58] Field of Search ................................. 427/333, 215, 427/212, 220, 301, 399

[56] References Cited

U.S. PATENT DOCUMENTS

| | | | |
|---|---|---|---|
| 3,404,061 | 10/1968 | Shane et al. | 161/125 |
| 4,895,713 | 1/1990 | Greinke et al. | 423/448 |
| 5,149,518 | 9/1992 | Mercuri et al. | 423/449 |
| 5,173,515 | 12/1992 | Von Bonin et al. | 521/103 |
| 5,376,450 | 12/1994 | Greinke et al. | 428/402 |
| 5,582,811 | 12/1996 | Greinke et al. | 423/265 |

*Primary Examiner*—Timothy Meeks
*Assistant Examiner*—Jennifer Kolb

[57] ABSTRACT

Intercalated graphite flake which has enhanced exfoliation volume characteristics at relatively low exfoliation temperatures e.g. 600° C. is made by heating a blend of intercalated particles and an organic reducing agent in the temperature range of 25° to 110° C.

13 Claims, No Drawings

EXPANDABLE GRAPHITE AND METHOD

FIELD OF THE INVENTION

This invention relates to intercalated graphite flake having increased exfoliation volume at temperatures as low as 600° C.

BACKGROUND OF THE INVENTION

Graphite is a crystalline form of carbon comprising atoms bonded in flat layered planes with weaker bonds between the planes. By treating particles of graphite, such as natural graphite flake, with an intercalant of, e.g., a solution of sulfuric and nitric acid, the crystal structure of the graphite reacts to form a compound of graphite and the intercalant. The treated particles of graphite are hereafter referred to as intercalated graphite flake. Upon exposure to elevated temperatures the particles of intercalated graphite expand in dimension in an accordion-like fashion in the c-direction, i.e. in the direction perpendicular to the crystalline planes of the graphite.

Intercalated graphite flake has many useful applications. A common application is to exfoliate the intercalated graphite particles into vermicular-like structures which are then compressed into sheets of flexible graphite for use in the manufacture of gaskets or as packing material. Intercalated graphite flake is also used in a variety of products which take advantage of the high expansion characteristic of intercalated graphite flake when exposed to high temperature. One such example is for use in combination with polymer foams to form seat cushions and furniture upholstery in aircraft. Upon exposure to fire, the high temperature will cause the particles of intercalated graphite to exfoliate which minimizes or prevents the formation of toxic gases from the polymer foam and may, of itself, smother a fire.

Since it is important to suppress, i.e. retard a fire before it has begun to spread, it would be a substantial advantage for an intercalated graphite flake product to exhibit a very high degree of exfoliation upon exposure to temperatures as low as 600° C.

It has been discovered in accordance with the present invention that the treatment of intercalated graphite flake with an organic reducing agent, following intercalation of the graphite flake with an oxidizing intercalant solution, and while the graphite flake is covered with a coating of oxidizing intercalant solution, results in a material which exhibits enhanced exfoliation volumes at exfoliation temperatures as low as 600° C.

SUMMARY OF THE INVENTION

The method of the present invention for forming particles of intercalated graphite flake having enhanced exfoliation volume at temperatures as low as 600° C. by:
 (a) treating particles of graphite with an oxidizing intercalant solution to provide intercalated graphite flake with a surface film of oxidizing intercalant solution;
 (b) contacting the surface film of the intercalated graphite flake with a reducing agent in the form of an organic compound selected from sugars, alcohols, aldehydes and esters which are reactive with the film of oxidizing intercalant solution at temperatures in the range of 25° C. to 110° C.; and
 (c) subjecting the thus treated intercalated graphite flake to a temperature in the range of 25° C. to 110° C. to promote a reaction of the organic compound with the surface film of oxidizing solution.

DETAILED DESCRIPTION OF THE INVENTION

Intercalated graphite flake is conventionally formed by treating particles of natural graphite with agents that intercalate into the crystal structure of the graphite to form a compound of graphite and the intercalant capable of expansion in the c-direction, i.e. the direction perpendicular to the crystalline planes of the graphite, when heated to a high temperature of above 700° C. and preferably above 1000° C. The intercalated graphite flake is washed and dried prior to exfoliation. Exfoliated graphite particles are vermiform in appearance and are commonly referred to as "worms".

A common conventional method for forming intercalated graphite flake (and for manufacturing sheets of flexible graphite from exfoliated graphite) is described in U.S. Pat. No. 3,404,061 the disclosure of which is incorporated herein by reference. As disclosed in the above mentioned patent natural graphite flake is intercalated by dispersing flakes in a solution containing an oxidizing agent, such as a mixture of nitric and sulfuric acid. After the flakes are intercalated excess solution is drained from the flakes. The quantity of intercalation solution retained on the flakes after draining is typically greater than 100 parts of solution by weight per 100 parts by weight of graphite flakes (pph) and more typically about 100 to 150 pph.

The intercalant of the present invention contains oxidizing intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In the preferred embodiment of the invention, the intercalant is a solution of sulfuric acid, or sulfuric acid and phosphoric acid, and an oxidizing agent, i.e. nitric acid, perchloric acid, chromic acid, potassium permanganate, iodic or periodic acids, or the like. Although less preferred, the intercalant may contain metal halides such as ferric chloride, and ferric chloride mixed with sulfuric acid, or a halogen, such as bromine as a solution of bromine and sulfuric acid or bromine in an organic solvent.

In accordance with the present invention the particles of graphite flake treated with intercalant are contacted e.g. by blending, with a reducing organic agent selected from alcohols, sugars, aldehydes and esters which are reactive with the surface film of oxidizing intercalating solution at temperatures in the range of 25° C. and 110° C. Suitable specific organic agents include the following: hexadecanol, octadecanol, 1-octanol, 2-octanol, decylalcohol, 1, 10 decanediol, decylaldehyde, 1-propanol, 1,3 propanediol, ethyleneglycol, dextrose, lactose, sucrose, potato starch, ethylene glycol monostearate, diethylene glycol dibenzoate, propylene glycol monostearate, and glycerol monostearate.

The amount of organic reducing agent is suitably from about 0.75 to 4% by weight of the weight of the particles of graphite flake.

Following the blending of the intercalant coated intercalated graphite flake with the organic reducing agent the blend is exposed to temperatures in the range of 25° to 110° C. to promote reaction of the reducing agent and intercalant coating. The heating period is from about 20 hours to one-half hour with shorter heating periods for higher temperatures in the above-noted range.

EXAMPLE 1

Twenty-five grams of Stratmin W *(+50 mesh) natural graphite flake were intercalated with twenty-five grams of intercalant consisting of 86 parts by weight of 93% sulfuric acid and 14 parts by weight of 67% nitric acid. After mixing for three minutes, 1.0 grams of decanol were blended into the flakes. The flakes were then placed in a 90° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

* available from Stratmin Graphite Inc.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 222 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 566 cc/g.

COMPARATIVE EXAMPLE 1 (A)

Twenty -five grams of Stratmin W (+50 mesh) natural graphite flake were intercalated for 20 minutes with 25 grams of intercalant consisting of 86 parts by weight of 93% sulfuric acid and 14 parts by weight of 67% nitric acid. No reducing agent and no external heat and digestion period were applied to the intercalated flakes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 32 cc/g. The expansion was inferior to that obtained in example (1) since neither a reducing agent nor a high temperature digestion period were employed.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 110 cc/g. The expansion was inferior to that obtained in example (1) since neither a reducing agent nor a high temperature digestion period were employed.

COMPARATIVE EXAMPLE 1 (B)

Twenty-five grams of Stratmin W (+50 mesh) natural graphite flake were intercalated for 3 minutes with 25 grams of intercalant consisting of 86 parts by weight of 93% sulfuric acid and 14 parts by weight of 67% nitric acid. No reducing agent was applied to the intercalated flakes. The flakes were then placed in a 100° C. oven for 20 minutes.

The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 26 cc/g. The expansion was inferior to that obtained in example (1) since no reducing agent was employed with the process.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 147 cc/g. The expansion was inferior to that obtained in example (1) since no reducing agent was employed with the process.

EXAMPLE 2

Twenty -five grams of Stratmin W (+50 mesh) natural graphite flake were intercalated with 25 grams of intercalant consisting of 86 parts by weight of 98% sulfuric acid and 14 parts by weight of 67% nitric acid. After mixing for three minutes, 2 grams of hexadecanol were blended into the flakes. The flakes were then placed in a 90° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 178 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 531 cc/g.

COMPARATIVE EXAMPLE 2

Twenty-five grams of Stratmin W (+50 mesh) natural graphite flake were intercalated for 20 minutes with 25 grams of intercalant consisting of 86 parts by weight of 98% sulfuric acid and 14 parts by weight of 67% nitric acid. No reducing agent and no external heat were applied to the intercalated flakes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes were measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 30 cc/g. The expansion was inferior to that obtained in example (2) since no reducing agent and no external heat were applied to the intercalated flakes.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 142 cc/g. The expansion was inferior to that obtained in example (2) since no reducing agent and no external heat were applied to the intercalated flakes.

EXAMPLE 3

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 0.75 grams of 1-octanol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 203 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 634 cc/g.

COMPARATIVE FOR EXAMPLES 3 to 8

Twenty-five grams of Stratmin W (+50 mesh) natural graphite flake were intercalated for 20 minutes with 25 grams of intercalant consisting of 90 parts by weight of 93% sulfuric acid and 10 parts by weight of 67% nitric acid. No reducing agent and no external heat were applied to the intercalated flakes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes were measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 29 cc/g. The expansion was inferior to that obtained in examples (3 to 8) since no reducing agent and no external heat were applied to the intercalated flakes.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 188 cc/g. The expansion was inferior to that obtained in examples (3 to 8) since no reducing agent and no external heat were applied to the intercalated flakes.

EXAMPLE 4

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 0.50 grams of 1-propanol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 94 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 439 cc/g.

EXAMPLE 5

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 0.375 grams of 1,3-propanediol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 83 cc/g.

The expansion or exfoliation volume of the intercalated flakes was also measured by heating the intercalated graphite flakes in a 945° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 381 cc/g.

EXAMPLE 6

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 0.500 grams of 1,10 decanediol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 116 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 511 cc/g.

EXAMPLE 7

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 1.00 grams of decylaldehyde were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 156 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 521 cc/g.

EXAMPLE 8

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 1.0 gram of the ester, ethylene glycol monostearate, was blended into the flakes. The flakes were then stirred on a hot plate for 10 minutes temperature increasing to 90° C. to dissolve the ethylene glycol monostearate). The mixture was then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 124 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 379 cc/g.

EXAMPLE 9

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 0.375 grams of sucrose were blended into the flakes. The flakes were then stirred on a hot plate for 10 minutes (temperature increasing to 90° C. to dissolve the sucrose). The mixture was then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 73 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 342 cc/g.

COMPARATIVE FOR EXAMPLE 9

Twenty-five grams of Stratmin W (+50 mesh) natural graphite flake were intercalated with 25 grams of intercalant consisting of 90 parts by weight of 93% sulfuric acid and 10 parts by weight of 67% nitric acid. After mixing for three minutes, 0.375 grams of sucrose were blended into the flakes. The flakes were then stirred and blended at room temperature (20°) for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 31 cc/g. The expansion was inferior to that obtained for Example (9) since the sample was blended with sucrose at 20° C. for only 20 minutes.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 156 cc/g. The expansion was inferior to that obtained in example (9) since no external heat was applied to the intercalated flakes.

What is claimed is:

1. Method for providing intercalated graphite flake with increased exfoliation volume at exfoliation temperatures as low as 600° C. which comprises: (i) treating of graphite flake with an oxidizing intercalant solution to provide intercalated graphite flake having a surface film of oxidizing intercalant solution; (ii) blending said intercalated graphite flake which has a surface coating film of the oxidizing intercalant solution with an organic agent reactive with the oxidizing intercalant solution at temperatures of from 25° C. to 110° C., selected from sugars, alcohols, aldehydes and esters in an amount of from 0.75 to 4% by weight of the graphite flake; and (iii) heating the blend of step (ii) to a temperature in the range of 25° C. to 110° C. to promote reaction of the organic agent with the coating of oxidizing intercalant solution.

2. Method in accordance with claim 1 wherein a temperature in the range of 25° C. to 110° C. is maintained for at least one-half hour.

3. Method in accordance with claim 1 wherein said oxidizing intercalant solution is a mixture of nitric acid and sulfluric acid.

4. Method in accordance with claim 1 wherein said organic agent is decanol.

5. Method in accordance with claim 1 wherein said organic agent is hexadecanol.

6. Method in accordance with claim 1 wherein said organic agent is 1-octanol.

7. Method in accordance with claim 1 wherein said organic agent is 1-propanol.

8. Method in accordance with claim 1 wherein said organic agent is 1,3 propanediol.

9. Method in accordance with claim 1 wherein said organic agent is 1, 10 decanediol.

10. Method in accordance with claim 1 wherein said organic agent is decylaldehyde.

11. Method in accordance with claim 1 wherein said organic agent is ethylene glycol.

12. Method in accordance with claim 1 wherein said organic agent is monostearate.

13. Method in accordance with claim 1 wherein said organic agent is sucrose.

* * * * *